(12) United States Patent
Alvord et al.

(10) Patent No.: US 9,058,474 B2
(45) Date of Patent: Jun. 16, 2015

(54) BIOMETRIC DEVICE, SYSTEM, AND METHOD FOR INDIVIDUAL ACCESS CONTROL

(75) Inventors: Chuck H. Alvord, Waterford, VA (US); Marvin M. Matthews, Alexandria, VA (US); Stephen C. Hick, Falls Church, VA (US); Medge R. Canseco, Annandale, VA (US)

(73) Assignee: NORTHROP GRUMMAN SYSTEMS CORPORATION, Los Angeles, CA (US)

( * ) Notice: Subject to any disclaimer, the term of this patent is extended or adjusted under 35 U.S.C. 154(b) by 632 days.

(21) Appl. No.: 12/654,143

(22) Filed: Dec. 11, 2009

(65) Prior Publication Data

US 2010/0214057 A1    Aug. 26, 2010

Related U.S. Application Data (60) Provisional application No. 61/193,627, filed on Dec. 11, 2008.

(51) Int. Cl.
*G05B 19/00* (2006.01)
*G06F 21/32* (2013.01)
(Continued)

(52) U.S. Cl.
CPC .................. *G06F 21/32* (2013.01); *G01S 19/14* (2013.01); *G06K 9/00006* (2013.01);
(Continued)

(58) Field of Classification Search
CPC ..... H04W 64/00; H04W 64/003; H04W 4/02; H04W 4/021; H04W 4/022; H04W 4/025–4/028; H04W 4/04; H04W 12/00; H04W 12/06; H04W 12/08; H04L 29/08657; H04L 67/18; G01S 5/00; G01S 5/0009; G01S 5/0018; G01S 5/0027; G01S 5/0036; G01S 5/0252; G01S 5/0284; G01S 5/0289; G01S 19/00; G01S 19/01; G01S 19/13; G01S 19/14; G01S 19/42; G01S 19/51; G06K 9/00; G06K 9/00006; G06K 21/31; G06K 21/32
USPC .......... 340/1.1, 5.1, 5.2, 5.51, 5.52, 5.53, 5.8, 340/5.81, 5.82, 5.83, 539.1, 539.11, 539.13, 340/539.14, 539.15; 382/124–127; 455/456.1–457

See application file for complete search history.

(56) References Cited

U.S. PATENT DOCUMENTS 6,111,506 A * 8/2000 Yap et al. ............ 340/572.1
6,335,688 B1 * 1/2002 Sweatte .............. 340/573.1

(Continued)

*Primary Examiner* — Steven Lim
*Assistant Examiner* — Ryan Sherwin
(74) *Attorney, Agent, or Firm* — Andrews Kurth LLP; Sean S. Wooden; Matthew J. Esserman (57) ABSTRACT

A biometric device, and a corresponding system and a method, is used to control human access to an arbitrary area. The device includes a biometric capture system that reads specified biometric information from an individual and that compares the biometric information to previously stored biometric information to determine a match between the read and stored biometric information; a position location system that records the geographic location of the device, and determines if the device is inside the United States or outside the United States; an encryption system that encrypts the geographic location and a device-unique identification; and a wireless system that sends the encrypted geographic location and the device-unique identification to a remote location, where if the geographic location is inside the United States, the device receives a test satisfactory signal, and where if the geographic location is outside the United States, the device receives an exit satisfactory signal.

22 Claims, 5 Drawing Sheets

(51) Int. Cl.
    *G01S 19/14*    (2010.01)
    *G06K 9/00*     (2006.01)
    *G01S 5/00*     (2006.01)
    *H04W 4/02*     (2009.01)
    *H04W 12/00*    (2009.01)

(52) U.S. Cl.
    CPC ............ *G01S 5/0009* (2013.01); *H04W 4/021* (2013.01); *H04W 12/00* (2013.01); *G06F 2221/2101* (2013.01); *G06F 2221/2107* (2013.01); *G06F 2221/2111* (2013.01)

(56) References Cited

U.S. PATENT DOCUMENTS

| | | | |
|---|---|---|---|
| 6,484,260 B1* | 11/2002 | Scott et al. | 713/186 |
| 6,618,593 B1* | 9/2003 | Drutman et al. | 455/456.3 |
| 6,975,222 B2* | 12/2005 | Krishan et al. | 340/539.13 |
| 7,015,817 B2* | 3/2006 | Copley et al. | 340/573.4 |
| 7,090,126 B2* | 8/2006 | Kelly et al. | 235/384 |
| 7,162,060 B1* | 1/2007 | Barton et al. | 382/126 |
| 7,389,274 B2* | 6/2008 | Sansone et al. | 705/60 |
| 7,546,127 B2* | 6/2009 | Caspi et al. | 455/456.1 |
| 2002/0087857 A1* | 7/2002 | Tsao et al. | 713/155 |
| 2003/0149343 A1* | 8/2003 | Siegel et al. | 600/300 |
| 2004/0125993 A1* | 7/2004 | Zhao et al. | 382/124 |
| 2004/0229560 A1* | 11/2004 | Maloney | 455/3.01 |
| 2005/0039014 A1* | 2/2005 | Sajkowsky | 713/172 |
| 2005/0179539 A1* | 8/2005 | Hill et al. | 340/539.1 |
| 2006/0163360 A1* | 7/2006 | Steusloff et al. | 235/472.02 |
| 2006/0222211 A1* | 10/2006 | Olivo et al. | 382/115 |
| 2008/0023543 A1* | 1/2008 | Beisang | 235/382 |
| 2008/0238613 A1* | 10/2008 | Salva Calcagno | 340/5.83 |
| 2008/0274752 A1* | 11/2008 | Houri | 455/456.1 |
| 2009/0024788 A1* | 1/2009 | Kuriyama | 711/103 |
| 2009/0320538 A1* | 12/2009 | Pellaton | 70/278.1 |
| 2010/0109835 A1* | 5/2010 | Alrabady et al. | 340/5.2 |

* cited by examiner

BIOMETRIC DEVICE, SYSTEM, AND METHOD FOR INDIVIDUAL ACCESS CONTROL

RELATED APPLICATION(S)

This application claims priority from U.S. Provisional Application No. 61/193,627 filed on Dec. 11, 2008.

TECHNICAL FIELD

The technical field is devices, systems, and methods for controlling access of individuals to specific facilities and areas.

BACKGROUND

Private and government entities may, from time to time, desire to limit or otherwise control access, by specific individuals, to certain facilities or geographical areas. One means for controlling access begins with identifying individuals whose access is to be limited, and then issuing these individuals some form of entry device, where such a device may include a hard copy (i.e., paper) pass, a key, or a magnetic card, for example. Such entry devices may include an expiration mechanism (e.g., on a paper pass, simply a stated expiration date). Some of these devices may provide a signal when the individual (or at least the entry device) has left the facility or geographical area under access control (for example, a magnetic card reader can read an entry and an exit of a magnetic card, and such entry and exit may be recorded). However, these entry devices have serious drawbacks, not the least of which includes the possibility of obtaining fraudulent devices.

A specific example of using entry devices to control access to geographical areas is the US-VISIT program, operated by the U.S. Department of Homeland Security (DHS), in cooperation with other Federal agencies. The US-VISIT program operates as a means for enhancing security and safety of U.S. citizens by controlling the entry and exit of certain individuals into and out of the United States. The US-VISIT currently applies to all international visitors (with limited exemptions) entering the United States. One aspect of US-VISIT is the use of biometric data as part of the entry procedures for international visitors holding a non-U.S. passport or visa. The US-VISIT program provides visa-issuing posts and ports of entry with the biometric technology that enables the U.S. government to establish and verify an individual's identity when visiting the United States. In many cases, this process begins overseas at a U.S. visa issuing post, where the individual's biometrics—digital fingerprints and a photograph—are collected and checked against a watch list of known criminals and suspected terrorists. When the individual arrives at a U.S. port of entry (POE), a U.S. Customs and Border Protection officer will scan up to ten fingerprints from the international visitor and take the visitor's photograph with a digital camera. These data are collected so that DHS can verify that the individual at the U.S. POE is the same individual who received the visa.

During the pre-entry process, and upon arrival at the Untied States, biometric data are collected because, unlike names and dates of birth, which can be changed, biometrics are unique and virtually impossible to forge. Collecting biometrics helps the U.S. government prevent individuals from using fraudulent documents to enter the United States illegally.

However, the US-VISIT program does not have an automated, easy to use, yet reliable means for determining when an international visitor has exited the United States. Currently, international visitors are required to complete a DHS Form I-94 (Arrival-Departure Record) to complete the U.S. entry-exit process. Using biometric data to confirm U.S.-exits of an international visitor will further enhance U.S. safety and security.

SUMMARY

Disclosed is a biometric device useable to control human access to an arbitrary area. The device includes a biometric capture system that reads specified biometric information from an individual and that compares the biometric information to previously stored biometric information to determine a match between the read and stored biometric information; a position location system that records the geographic location of the device, and determines if the device is inside the United States or outside the United States; an encryption system that encrypts the geographic location and a device-unique identification; and a wireless system that sends the encrypted geographic location and the device-unique identification to a remote location, wherein if the geographic location is inside the United States, the device receives a test satisfactory signal, and wherein if the geographic location is outside the United States, the device receives an exit satisfactory signal.

DESCRIPTION OF THE DRAWINGS

The detailed description will refer to the following drawings in which like numerals refer to like items, and in which.

DETAILED DESCRIPTION

The U.S. Department of Homeland Security (DHS), in cooperation with other Federal agencies, administers the US-VISIT program, which is designed to enhance safety and security for U.S. citizens and international visitors while facilitating legitimate travel and trade across U.S. borders. US-VISIT helps to secure U.S. borders, facilitate the entry and exit process, and enhance the integrity of the immigration system while respecting the privacy of international visitors to the United States.

US-VISIT is part of a continuum of security measures that begins overseas and continues through an international visitor's arrival to and departure from the United States. US-VISIT incorporates eligibility determinations made by both the Departments of Homeland Security and State.

In those cases where a visa is issued by the Department of State, biometrics such as digital, inkless fingerscans and digital photographs allow the DHS to determine whether an individual trying to enter the United States is the same individual who was issued a visa by the Department of State. Additionally, the biometric data are checked against watch lists, improving the DHS's ability to make admissibility decisions as well as the Department of State's ability to make visa determinations. To perform these functions, the DHS operates a central server or equivalent processor and maintains a number of databases, including ADIS/IDENT. Included in these databases are visitor travel records and other data related to each international traveler whom may enter the United States, or who is in the United States.

US-VISIT currently applies to all visitors (with limited exemptions) holding non-immigrant visas, regardless of country of origin.

Among all the biometric techniques, fingerprint-based identification is the oldest method, and has been used successfully in numerous applications. Everyone is known to have unique, immutable fingerprints. A fingerprint is made of a series of ridges and furrows on the surface of the finger. The uniqueness of a fingerprint can be determined by the pattern of ridges and furrows as well as the minutiae points. Minutiae points are local ridge characteristics that occur at either a ridge bifurcation or a ridge ending.

A critical step in automatic fingerprint matching is to automatically and reliably extract minutiae from the input fingerprint images. However, the performance of a minutiae extraction algorithm relies heavily on the quality of the input fingerprint images. To enhance the performance of an automatic fingerprint identification/verification system a fingerprint enhancement algorithm may be used with the minutiae extraction algorithm. Fast fingerprint enhancement algorithms exist that can adaptively improve the clarity of ridge and furrow structures of input fingerprint images based on the estimated local ridge orientation and frequency. These and other techniques can be used to improve minutiae extraction and, correspondingly, the accuracy of a fingerprint verification system.

In an improvement over current US-VISIT systems and methods, described herein is an entry/exit biometric device, and accompanying system and method, for controlling access to the United States. As one of ordinary skill in the art will appreciate, the inventive concepts embodied in the biometric device, method, and system can be extended to access control for other countries, to specific geographic regions, and to specific facilities (e.g., buildings).

Figure 1:
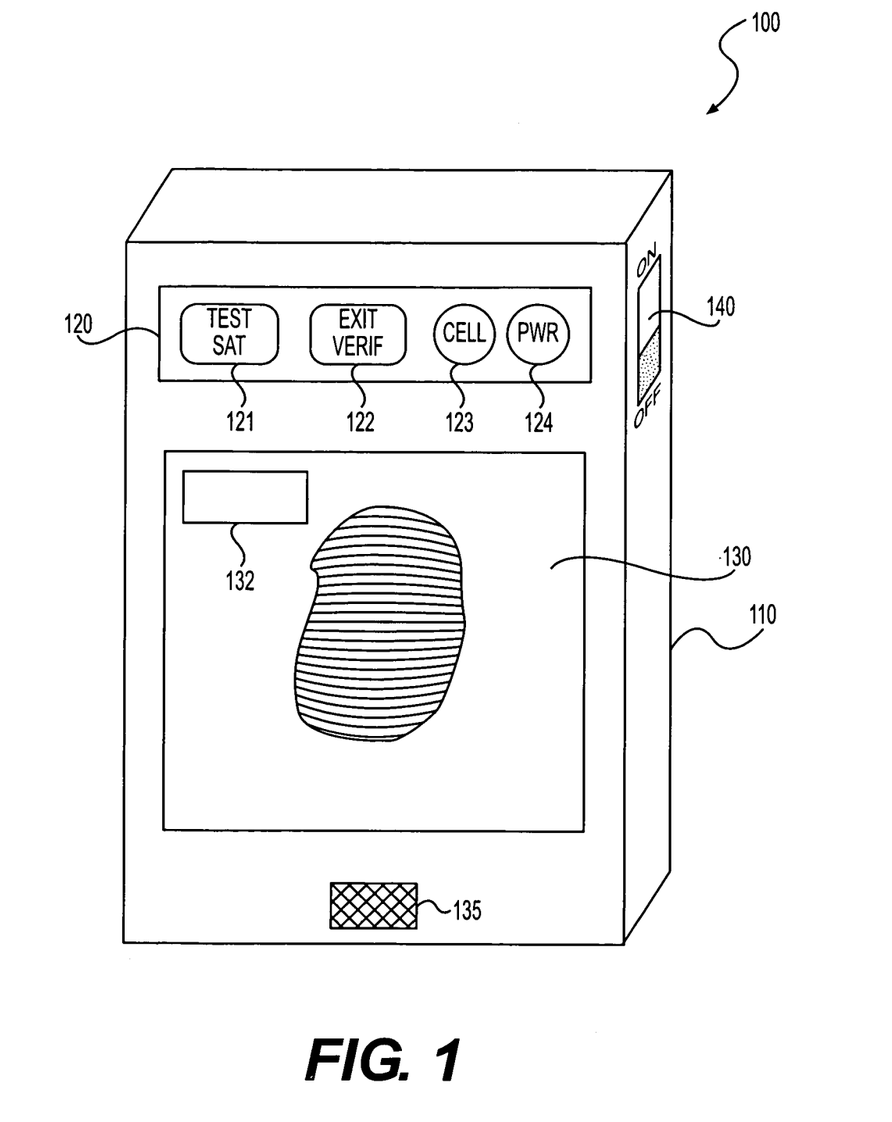
FIG. 1 illustrates an exemplary biometric device that may be used as part of the US-VISIT program to control access of international visitors into the United States.

FIG. 1 illustrates an exemplary biometric device 100 that may be used as part of the US-VISIT program. The device 100 includes housing 110, which may be of a size of a current cell phone, for example. To protect the integrity of data stored on the device 100, the housing 110 may include certain tamper-resistant features to prevent unauthorized opening of the device 100. One such feature may include a disable feature that permanently disables the device 100 should the housing 110 be opened in an unauthorized manner. Another feature may simple erase any stored data and programs should the housing 110 be tampered with. The device 100 includes a status section 120. The status section 120 includes a multipurpose indicator 121 that may be used to indicate a satisfactory test of the device, and for other purposes such as indicating successful capture of biometric data, for example; an exit verification indicator 122; a wireless connectivity indicator 123; and a power indicator 124. The multipurpose indicator 121 may be a LCD or equivalent device, and may present an appropriate text message, icon, or other equivalent message formatted signal. The multipurpose indicator 121 may be used when testing the device 100 to indicate that the test was successful, and may be used to indicate satisfactory capture of biometric information. The exit verification indicator 122 is similar to the multipurpose indicator 121, and may be used to indicate a successful exit from the United States. The wireless connectivity indicator 123 indicates when the device 100 is able to send and receive wireless communications in a satisfactory manner (e.g., sufficient signal strength). The power indicator 124 indicates when the device 100 is powered on and when the device 100 has sufficient power to operate and perform its intended functions.

The device 100 further includes a scanning window 130 which may optionally include a status window or touch screen control panel 132. The scanning window 130 is used to record biometric information, such as fingerprint information, from the device user (i.e., an international traveler entering/exiting the United States). To operate the scanning window 130, the international visitor simply places a finger on the scanning window surface. The visitor's fingerprint is scanned quickly. If the fingerprint data are successfully captured, the panel 132 presents a capture ok message (text message, icon, or other equivalent message format) to the international visitor. Alternately, the biometric data capture ok message may be presented by multipurpose indicator 121.

Finally, the device may include a microphone/speaker 135 to allow verbal communications between the device 100 and a device user, and an on/off switch 140. The on/off switch 140 is used to power up the device 100 from an internal power supply. The microphone 135 may be used in addition to or in lieu of the status panel indicators and status panel 132 to provide information to the international visitor (in a language appropriate to that visitor) and to receive commands from that visitor.

Although the above description describes capture of only one fingerprint from the international visitor, the device 100 may be set to require capture of fingerprint data from more than one finger. In this situation, the device 100 may indicate, verbally (microphone 135) or visually (panel 132) which specific finger is to be scanned (e.g., index finger, left hand) or simply that any three fingers, for example, are to be scanned.

Figure 2:
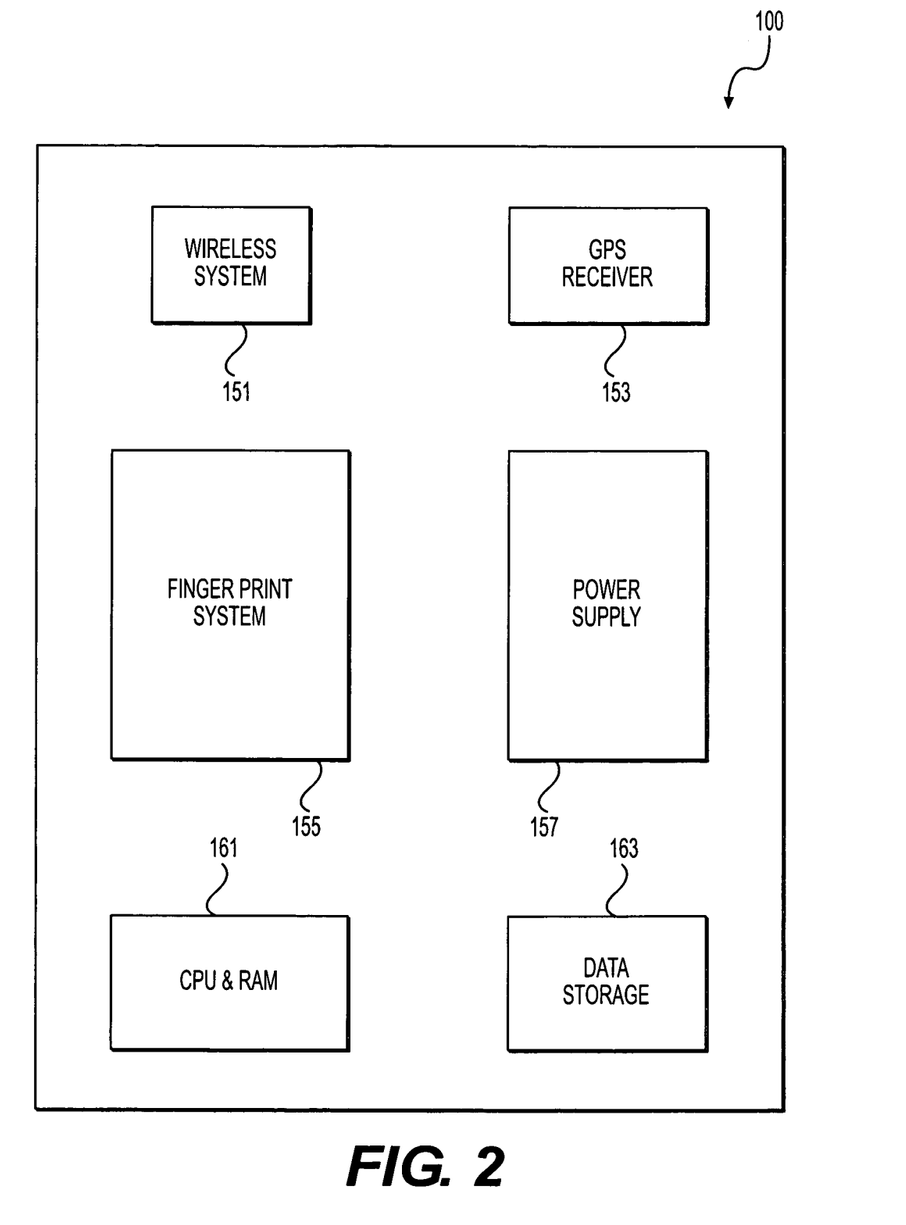
FIG. 2 is an exemplary block diagram of selected components of the biometric device of FIG. 1.

To provide the functionality shown in FIG. 1, the device 100 incorporates certain internal components for recording data, processing the data, storing the data, and communicating with external devices. FIG. 2 is an exemplary block diagram of certain internal components of the device 100. When one of the internal components of the device 100 is designed to execute a processing function, that component may be embodied as software, hardware, or firmware. Furthermore, the arrangement of components in the device 100 is not meant to be limiting, and many of the processing and data storage functions of the device 100 may be combined or divided among the components shown or among other, similar components.

As shown in FIG. 2, the device 100 includes wireless system 151, GPS transceiver 153, biometric capture system 155, power supply 157, CPU & RAM 161, and data store 163. The wireless system 151 may incorporate available cell phone technology except that the technology would enable the device 100 to send/receive in the United States and outside the United States. Each device 100 is programmed to place one call, and one call only, namely to a DHS central server (see FIG. 3) for testing (inside U.S.) and exit verification (outside the U.S.) functions. Should the wireless system 151 not be able to access a signal sufficient to allow two-way communications from the device 100 to the central server, the wireless system 151 will send an appropriate signal to deactivate the wireless connectivity indicator 123 (FIG. 1).

The GPS transceiver 153 communicates with an appropriate GPS satellite and GPS system to provide current latitude and longitude information for the device 100 to the DHS central server, or other appropriate location. In an embodiment, this GPS function is activated only after a satisfactory biometric capture (test or exit) and, when biometric comparison is executed on the device 100, a comparison satisfactory check of the international visitor's biometric information.

The biometric capture system 155 is used to scan a visitor's fingerprint(s), send the fingerprint information to the data store 163, when the device 100 is used to store such information, compare the captured fingerprint information to fingerprint information already stored in the data store 163, and generate a capture ok signal and a compare ok signal, as appropriate, to enable display of a corresponding message to the international visitor, to initiate a GPS location step of the device 100, and as an initial step in generating an exit satisfactory signal to be sent to the DHS central server.

The biometric capture system 155 may be configured and programmed to scan and record minutiae data from any number of fingers of the international visitor. In one embodiment, the system 155 may randomly instruct the visitor which finger(s) to scan. For example, the system 155 may randomly instruct the visitor to scan the left index finger. In another embodiment, the system 155 may instruct the visitor to scan fewer than ten fingers (e.g., three fingers) without specifying which fingers. In still another alternative, the system 155 may accept any one finger for scanning purposes. Finally, the system 155 may require the visitor to scan all ten fingers. With any of these alternatives, the system 155 will identify the finger scanned and compare the recorded minutiae information to corresponding information stored on the device by way of a minutiae template. Alternatively, the system 155 will prepare the finger scan data for transmission to the DHS central server for minutiae extraction and verification. In yet another alternative, the system 155 extracts the minutiae and finger identity and prepares these data for transmission to the DHS central server for verification purposes.

The power supply 157 may be any appropriate energy storage, control, and distribution device, including, for example, a rechargeable lithium battery. Alternatively, the power supply may be a non-rechargeable (but replaceable) battery. Unless the international visitor repeatedly tests the device 100, or, has an extended stay within the United States, a non-rechargeable battery should be adequate for testing and exit procedures.

The CPU & RAM 161 includes the algorithms, instruction, and routines needed to complete operation of the device 100, including its many display and messaging features. The CPU & RAM 161 operates in conjunction with the other components of the device 100 to test operation of the device (in the U.S.) and to send an exit verification request signal (outside the U.S.) to the DHS central server. The CPU & RAM 161 also contains the routines needed to encrypt data to be sent from the device 100 to the DHS central server. Such encryption may include a time-based encryption technology and be based on a unique key, defined in the international visitor's travel record, for the device 100. In an embodiment, the information to be encrypted is the latitude and longitude of the device 100 and the device-unique identification only.

The data store 163, as noted above, may store fingerprint information. In an embodiment, the data store 163 stores a fingerprint template, comprising fingerprint minutiae for subsequent comparison to minutiae extracted from a fingerprint scan taken during a test (U.S.) or exit (outside the U.S.). The data store 163 also stores fingerprint scan data taken during a test or exit for comparison with the fingerprint template. Both the stored fingerprint template and the fingerprint scan data may be stored as encrypted data to prevent possible compromise of these data. This encryption prevents the international visitor or other person from altering and then restoring the data and prevents other individuals from accessing the international visitor's biometric data for any reason. The data store 163 also stores the device's unique identification. Finally, the data store 163 stores, on a temporary basis, the GPS location of the device 100. This GPS location temporary storage is completed coincident with a device test procedure and an exit verification procedure. No other personally identifiable information is stored on the device 100, thereby protecting the US-VISIT databases and the privacy of the international visitor.

Figure 3:
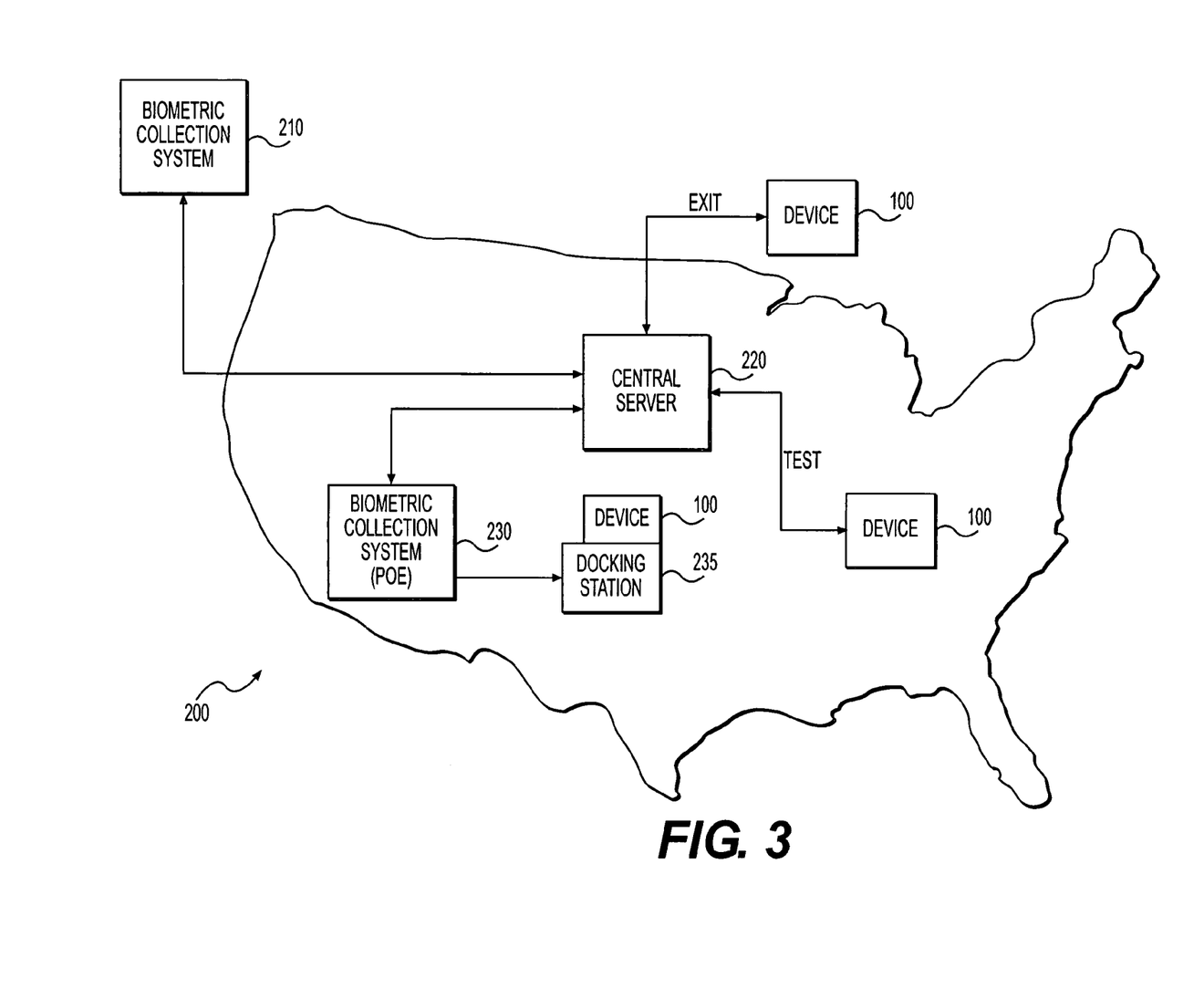
FIG. 3 illustrates an exemplary, system that uses the device of FIG. 1 to control access into the United States.

FIG. 3 illustrates an exemplary system 200 for controlling access by international visitors to the United States. The system 200 includes multiple biometric collection systems 210, which may be located outside the United States, typically at a U.S. visa issuing facility such as a U.S. consulate. A system 210 communicates with DHS central server 220, or similar server, which is located within the United States. In operation, an international visitor applying for entry into the United States visits a U.S. consulate, or similar location, where the system 210 is used to capture biometric information (e.g., all ten fingerprints and a photograph taken by a digital camera). The biometric information are then sent from the system 210 to the DHS central server 220, where the data are compared to biometric information from lists of known or suspected terrorists and other undesirable individuals. This initial (at the POE) comparison may result in denial of a visa. The comparison, alternatively, may be carried out in whole or in part at another facility (e.g., at the FBI) coupled to the DHS server 220.

The system 200 also includes biometric collection systems 230 located at U.S. points of entry (POE). When an international visitor arrives at the POE, that visitor's biometric is obtained, again, and the data are sent to the DHS central server 220 to verify that the international visitor at the POE is in fact the same individual as was at the U.S. consulate applying for a visa. If the data do not match, the international visitor is denied entry into the United States. Alternatively, the comparison may be conducted at the POE.

At attempted entry, if the data match, the international visitor is provided with a uniquely-identifiable biometric device 100. As shown in FIG. 3, the device 100 may, in an embodiment, be loaded into a docking station 235, and the international visitor's biometric information is loaded into the device 100. The international visitor then tests operation of the device 100, and maintains the device 100 until some time subsequent to exit from the United States. Note that operation of the device 100 within the United States constitutes a test of the device 100, while operation of the device 100 outside the United States constitutes an exit (or attempted exit).

As noted above, in an embodiment, the device 100, operating within the system 200 of FIG. 3 is used to store and compare visitor biometric data. Thus, for either a test procedure or an exit procedure, no personally identifiable information related to the international visitor will be transmitted from the device 100. Instead, only the devices' geographical position (latitude and longitude) and device identifier, are transmitted from the device 100. Even so, both the geographic position and the device identifier are encrypted prior to transmission from the device 100. Also, as noted above, in an embodiment, both the test procedure and the exit procedure will not proceed to the point where the encrypted data are transmitted from the device 100 if the biometric scan (Capture and/or comparison) is not successful. In addition, if a wireless signal (e.g., cellular) is not available, or if the device 100 lacks sufficient power to operate, including collection and transmission of geographic location data, then neither the test procedure nor the exit procedure can be successful. Thus, the international visitor should expect to test operation of the device 100 at least upon receipt of the device at the U.S. POE, and again before initiating a U.S. exit. This is so because a successful exit signal may be a precondition for a subsequent visit to the United States.

The device 100, and corresponding system 200, may be used for any entry/exit mode, including land entry and exit, seaborne entry and exit, and airborne entry and exit. Furthermore, the US-VISIT program is not intended as a mechanism to arrest or detain any exiting international visitor. Accordingly, the exit procedure need not be completed in real-time, near real-time, or otherwise coincident with a physical exit. Instead, the exit procedure merely is intended to verify that a specific international visitor has left the United States. However, the exit procedure should be completed as expeditiously as possible.

At the point of exit, using the device 100 will not cause or require any change from current exit procedures. Specifically, use of the device 100 will not require separate collection or verification of any biometric data or other personal data from the international visitor. Instead, the international visitor need not use the device 100 to execute the device's exit procedure until well clear of the point of exit. Indeed, as noted above, activation and use of the device 100 while within the borders of the United States merely will result in a device test procedure being invoked and completed.

When exiting the United States, or after exiting, when outside the United States, the international visitor will use the device 100 to transmit an exit verification request. The international visitor turns the device 100 on; observes the light display or status window for a message indicating sufficient battery power for transmission; sees that a wireless signal is available; and applies one or more fingers to the device 100. The device 100 indicates whether a good quality biometric data (e.g., a fingerprint) has been scanned or otherwise captured by the device 100, and subsequently verified; indicates when a wireless call has been initiated; and advises that the call is connected. Finally, the device 100 indicates the result of the exit verification request and, subsequently that the device 100 has been disabled.

If the device 100 does not display an exit acknowledgement, the device 100 will retry until successful or until turned off. If a satisfactory exit verification is not received within a few hours of the actual exit, or if the device 100 does not have sufficient battery power to successfully complete the exit procedure, then the international visitor will be prompted by to contact a US-VISIT exit hotline and/or submit the device 100 in person at an appropriate embassy or consular location to record the exit.

Upon successful exit, the device 100 is no longer needed by the international visitor, and the device 100 may, accordingly, be shut down and disabled. The international visitor may then return the disabled device 100 to a U.S. visa granting facility (U.S. consulate) or return the device 100 to DHS or a DHS agent by mail, for example.

Should the international visitor lose the device 100, then the same international visitor will be required to resubmit the same biographic data supported by official travel documents and identity verification by biometric record checks as at entry. Should the device 100 fail to operate properly while the international visitor is within the United States, then the international visitor may have to travel to a replacement service point to obtain a replacement device 100.

The device 100 is designed to be simple to operate and easy to understand. The device 100 incorporates, as noted above, a simple on/off switch; displays of wireless connectivity, battery power level, acceptable fingerprint capture, call connection and data transmission in progress, exit verification successful, device test successful; and a fingerprint reader/scanner. The device 100 may have its unique identifier displayed on the screen 130, or printed on the case 110.

To test the device 100, the international visitor, while within the U.S. borders, turns the device 100 on, checks to ensure that battery power and wireless connectivity are sufficient, and then places one or more fingers (sequentially) on the device scanning window. The device 100 should then provide a capture ok indication followed by a compare ok and a test ok indication. To complete the test, the device 100, reads the fingerprint data, compares the read fingerprint data to a corresponding minutiae template stored on the device 100, and if the read fingerprint data and the template provide a match, signals a capture ok and compare ok to the international visitor, and enables the GPS transceiver 153 to determine the GPS location of the device 100. The GPS location and the device identification are then encrypted and the encrypted data sent to the DHS central server 220. The DHS central server 220 receives the transmitted, encrypted GPS and device identification data, decrypts the data, determines that the GPS location is within the United States, and determines if the device identification matches that contained in the international visitor's travel records. If the device identification does not match, then the DHS central server 220 sends a signal to the device 100 that will deactivate the device 100 and disconnect the wireless connection to the DHS central server 220. If the device identification does match the device identification data contained in the international visitor's travel records, the DHS central server 220 returns an acknowledgement to the device 100 and disconnects the wireless connection between the device 100 and the DHS central server 220. The device 100 then provides the test ok indication to the international visitor.

The exit procedure using the device 100 is similar to that of the test procedure, except that the international visitor is outside the U.S. border. As a result, when the DHS central server 220 receives and decrypts the encrypted GPS location data, the DHS central server 220 determines that an exit verification procedure is in progress. If the device identification check is satisfactory, the DHS central server 220 updates the international visitor's travel records with the date and time of exit and with the GPS data, and sets the visitor's status to exit verified. The DHS central server 220 then sends a signal to the device 100 to provide an exit ok indication to the international visitor, to disable the device 100, and to disconnect the wireless connection between the device 100 and the DHS central server 220.

In the above description of the device 100, the biometric verification is conducted at and by the device 100, and no biometric data are transmitted outside the device 100 during either a test or an exit procedure. In another embodiment, however, the device 100 may be used to capture, encrypt, and transmit such biometric information to the DHS central server 220, and the DHS central server 220 then executes the biometric verification. While this alternative embodiment requires transmission of personal biometric data, such data would be transmitted as encrypted. Using the DHS central server 220 to perform the biometric verification provides specific advantages over a local biometric verification. First is that the visitor's biometric information need not be stored on the device 100. Second, the DHS server 220 need only perform a simple 1:1 verification rather than a full database search so that little time is required to complete the verification. Third, should the biometric check fail at the DHS server 220, other routines may be executed or used to verify the biometric data, including initiating a fingerprint search of the entire DHS database (or other fingerprint database), or review by a human fingerprint examiner.

The above description refers to the extraction and use of fingerprint minutiae for verifying a visitor's identity. Obtaining this minutiae data from a fingerprint is a complex process involving sophisticated image processing algorithms to find the minutiae points with high reliability. While such processing may be conveniently performed at the DHS central server 220, or at the POE when the international visitor first enters the United States, or prior to entry, upon application for a visa, performing such processing on the device 100 (during a test or exit) will require the device 100 to be loaded with the same or equivalent minutiae extraction routines, and will require the device 100 to be supplied with greater processing power than if the minutiae extraction were instead performed at the DHS central server 220. Thus, in an embodiment, the system 200 uses the device 100 to scan a single fingerprint, encrypt and compress the fingerprint data, and to send the compressed, encrypted fingerprint scan to the DHS central server 220, where the scan is decompressed, decrypted, and processed through a minutiae extraction algorithm for comparison to a minutiae template stored with the international visitor's travel records at the DHS central server 220.

However, use of minutiae at the device 100 level has its advantages. Notably, a minutiae file is perhaps 2 percent of the size of a corresponding fingerprint file. This makes transmission of minutiae data much faster and easier than fingerprint data. Thus, if biometric verification is performed at the DHS central server 220, transmitting minutiae data as opposed to fingerprint data has its advantages.

The success of the device 100 in providing an exit verification for a particular international visitor depends on many factors, including the quality of biometric data captured during the exit process. In an alternative embodiment, the device 100 may incorporate an adjustable threshold feature in the minutiae comparison algorithm so that, upon entry of the international visitor, the threshold may be adjusted by the U.S. Customs and Border Protection officer (e.g., during initial testing of the device 100) so that during subsequent testing and the exit, a satisfactory match will be obtained.

Figure 4:
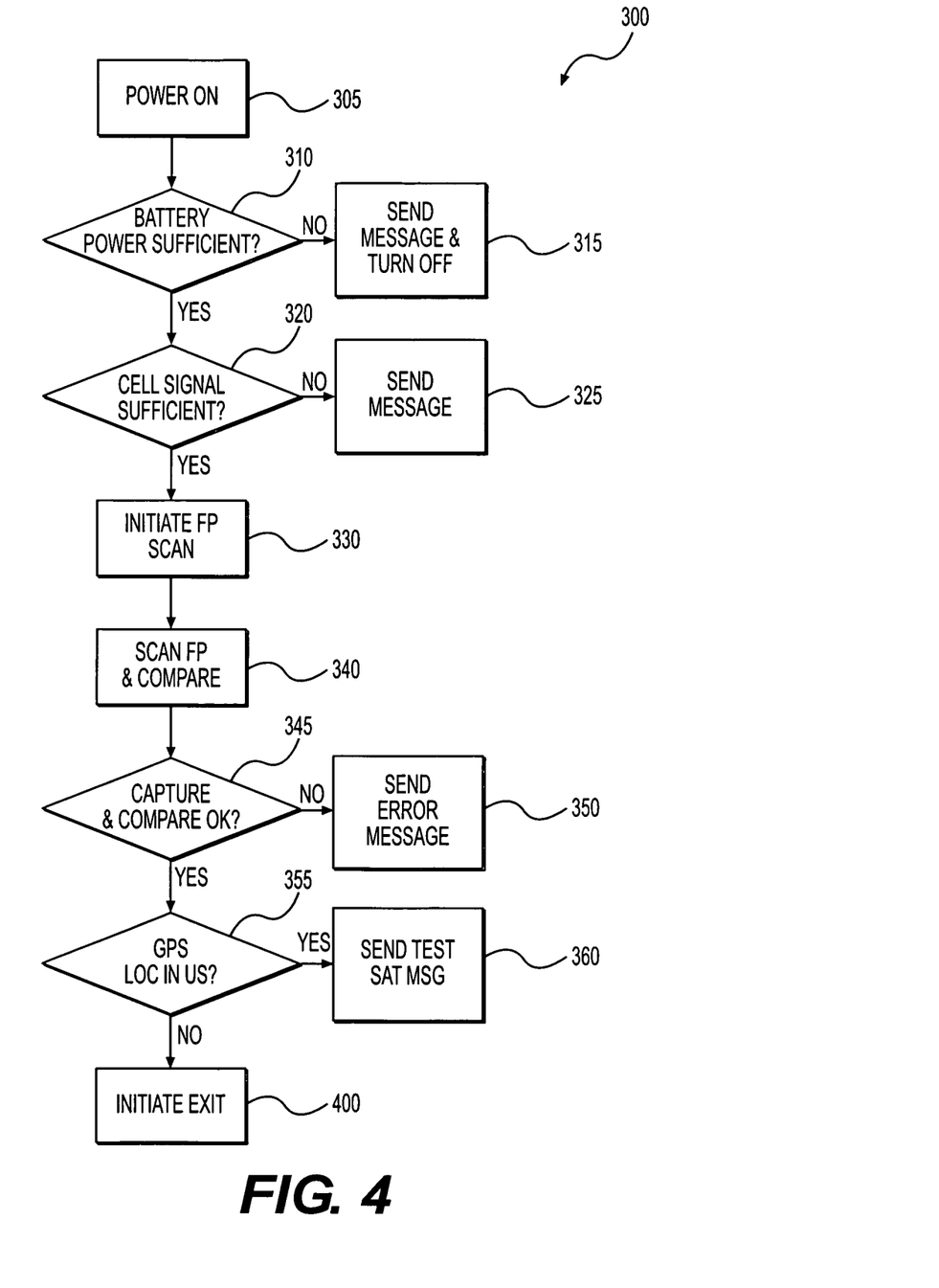
FIG. 4 is a flowchart illustrating an exemplary operation of the device of FIG. 1.

FIG. 4 is a flowchart illustrating an exemplary test/exit routine 300 executed by the device 100. After power on of the device (block 305), the device checks if the battery power is sufficient (block 310). If not, the device sends a message and turns off (block 315). If the battery power is sufficient (block 310), the device checks if the cell signal is sufficient (block 320). If not, the device sends a message (block 325). If the cell signal is sufficient (block 320), the device initiates fingerprint scan (block 330) and scans and compares the fingerprint (block 340). The device checks if the fingerprint capture and comparison are successful (block 345). If not, the device sends an error message (block 350). If the capture and comparison are okay (block 345), the device determines if the GPS location is inside the U.S. (block 355). If yes, the device sends a test satisfactory message (block 360). If the GPS location is outside the U.S. (block 355), the device initiates an exit routine 400.

Figure 5:
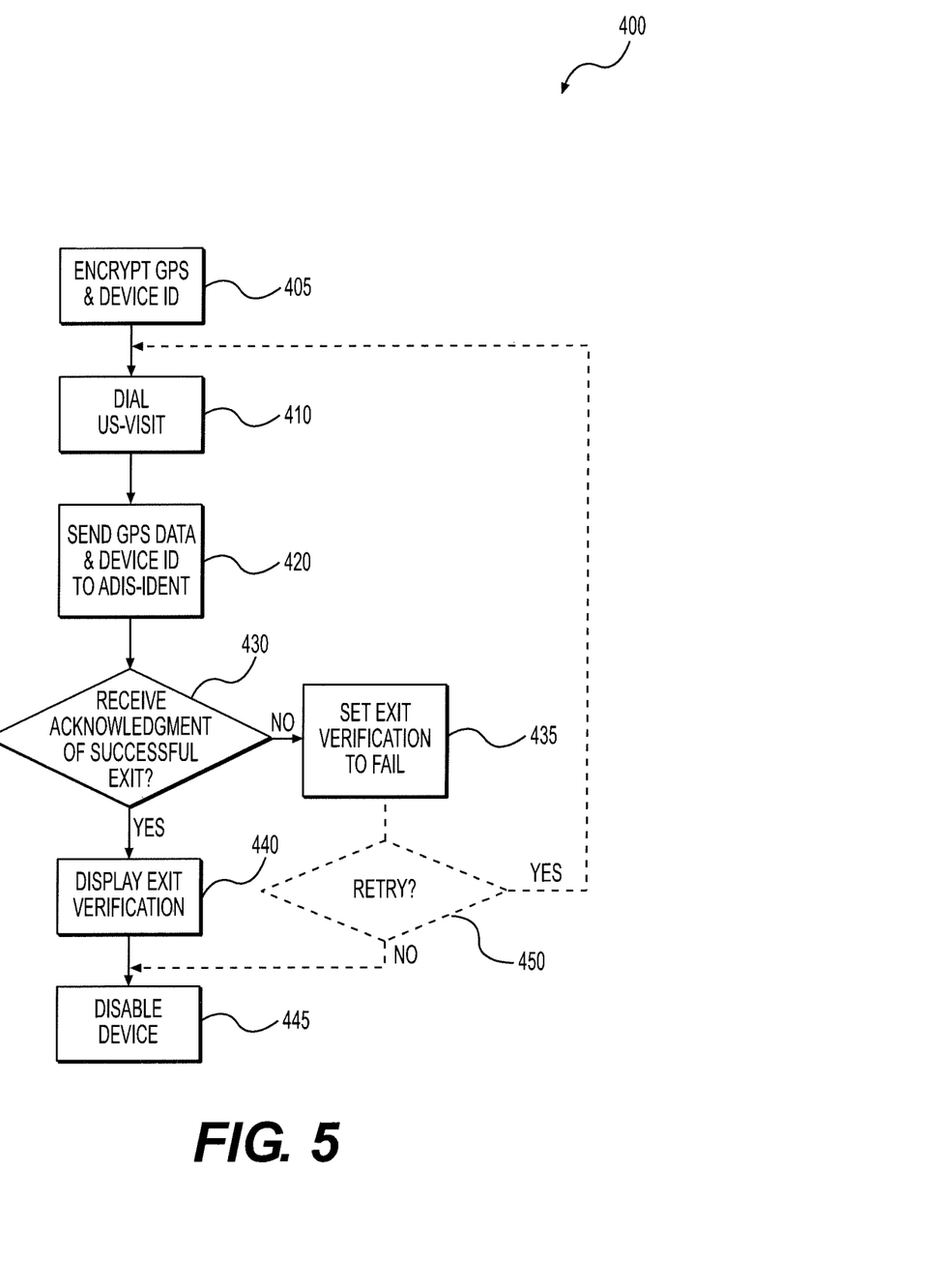
FIG. 5 is a further flowchart illustrating other exemplary operations of the device of FIG. 1.

FIG. 5 is a flowchart illustrating an exemplary exit routine 400 of the device 100. The routine 400 in FIG. 5 includes exemplary detailed steps of exit routine 400 of FIG. 4. The device encrypts the GPS location and the device ID in block 405, dials US-VISIT in block 410, and sends the GPS data and the device ID to ADIS-IDENT in block 420. The device then determines if it receives an acknowledgement of successful exit (block 430). If not, the device sets the exit verification to fail (block 435). If the device receives an acknowledgement of successful exit (block 430), the device displays exit verification (block 440) and disables itself (block 445). Optionally, following block 435, the device may retry (block 450) and go back to block 410.

In the preceding description, the device 100 and system 200 are used as part of the US-VISIT program. However, as noted above, such devices and systems may be used to control human access to virtually any geographic area (including and arbitrarily-defined area) or facility. Furthermore, the device 100 and system 200 may use biometric data other than fingerprint data including, without limitation, face recognition, DNA, hand and palm geometry, iris recognition, odor/scent, typing rhythm, gait, and voice.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A biometric system useable to control human access to an arbitrary area, the biometric system comprising:
a central server provided at a remote location; and
a biometric device comprising:
a biometric capture system that reads specified biometric information from an individual and that compares the specified biometric information to previously stored biometric information to determine a match between the read and stored biometric information;
a position location system that determines geographic location data of the biometric device;
an encryption system that encrypts the geographic location data and a device-unique identification; and
a wireless system using a wireless connection, that sends the encrypted geographic location data and the encrypted device-unique identification to the central server;
wherein the central server determines a geographic location of the biometric device from the encrypted geographic location data received from the biometric device, wherein if the geographic location is inside the United States, the biometric device receives a test satisfactory signal from the central server, and wherein if the geographic location is outside the United States, the central server determines that an exit verification procedure is in progress and updates a travel record with the date and time of exit, the central server generates an exit verification signal based on the determined geographic location and sends the exit verification signal to the biometric device, and the biometric device receives the exit verification signal from the central server and displays an exit verification in response to the received exit verification signal; and
wherein the biometric device is shut down and disabled upon receiving the exit verification signal or the biometric device disconnects the wireless connection upon receiving the exit verification signal.

2. The biometric system of claim 1, wherein the biometric capture system uses a minutiae extraction algorithm to read the specified biometric information.

3. The biometric system of claim 1, wherein the biometric device further comprises a housing enclosing the biometric capture system, the position location system, the encryption system, and the wireless system, wherein the housing includes tamper-resistant features to prevent unauthorized opening of the biometric device.

4. The biometric system of claim 3, wherein the tamper-resistant features include a disable feature that permanently disables the biometric device should the housing be opened in an unauthorized manner.

5. The biometric system of claim 3, wherein the tamper-resistant features include a disable feature that erases any stored data and programs should be the housing be tampered with.

6. The biometric system of claim 1, wherein the biometric device further comprises one or more of a multipurpose indicator that indicates a satisfactory test of the biometric device, an exit verification indicator that indicates a successful exit from the United States, a wireless connectivity indicator that indicates when the biometric device is able to send and receive wireless communications in a satisfactory manner, and a power indicator that indicates both when the biometric device is powered on and when the biometric device has sufficient power to operate and perform its intended functions.

7. The biometric system of claim 1, wherein the biometric device further comprises a scanning window that records the specified biometric information from the individual.

8. The biometric system of claim 7, wherein the scanning window includes a status window or a touch screen control panel.

9. The biometric system of claim 1, wherein the biometric device further comprises a microphone or a speaker to allow verbal communications between the biometric device and the individual.

10. The biometric system of claim 1, wherein the biometric capture system is set to require capture of fingerprint data from more than one finger.

11. The biometric system of claim 10, wherein the biometric capture system indicates which specific finger(s) is to be scanned.

12. The biometric system of claim 10, wherein the biometric capture system randomly instructs the individual which finger(s) to scan.

13. The biometric system of claim 10, wherein the biometric capture system identifies the finger scanned and compares the biometric information to the previously stored biometric information to determine a match.

14. The biometric system of claim 1, wherein the biometric device is shut down and disabled upon receiving the exit verification signal.

15. The biometric system of claim 1, wherein the biometric device receives the test satisfactory signal from the central server upon successful comparison of the specified biometric information with the previously stored biometric information, while the geographic location of the biometric device is inside the United States.

16. The biometric system of claim 15, wherein the wireless system does not send the specified biometric information to the central server.

17. The biometric system of claim 1, wherein the biometric device receives the exit verification signal from the central server upon successful comparison of the specified biometric information with the previously stored biometric information, while the geographic location of the biometric device is outside the United States.

18. The biometric system of claim 17, wherein the wireless system does not send the specified biometric information to the central server.

19. A method for controlling human access to an arbitrary area, the method comprising:
reading specified biometric information from an individual using a biometric device;
comparing, using the biometric device, the specified biometric information to previously stored biometric information to determine a match between the read and stored biometric information;
determining geographic location data of the biometric device using the biometric device;
encrypting, using the biometric device, the geographic location data and a device-unique identification;
sending, using a wireless connection, the encrypted geographic location data and the encrypted device-unique identification from the biometric device to a central server provided at a remote location; and
determining, via the central server, a geographic location of the biometric device from the encrypted geographic location data received from the biometric device;
if the geographic location is inside the United States, sending a test satisfactory signal from the central server to the biometric device; and
if the geographic location is outside the United States, the central server:
determining that an exit verification procedure is in progress;
updating a travel record with the date and time of exit;
generating an exit verification signal based on the determined geographic location; and
sending the exit verification signal from the central server to the biometric device;
wherein the biometric device is shut down and disabled upon receiving the exit verification signal or the biometric device disconnects the wireless connection upon receiving the exit verification signal.

20. A biometric system useable to control human access to an arbitrary area, the biometric system comprising:
a central server provided at a remote location; and
a biometric device comprising:
a biometric capture system that reads specified biometric information from an individual and that compares the specified biometric information to previously stored biometric information to determine a match between the read and stored biometric information;
a position location system that determines geographic location data of the biometric device;
an encryption system that encrypts the geographic location data and a device-unique identification; and
a wireless system, using a wireless connection, that sends the encrypted geographic location data and the encrypted device-unique identification to the central server;
wherein the central server determines a geographic location of the biometric device from the encrypted geographic location data received from the biometric device;
wherein the biometric device receives a test satisfactory signal from the central server if the geographic location is inside the United States;
wherein the central server determines that an exit verification procedure is in progress and updates a travel record with the date and time of exit, the central server generates an exit verification signal based on the determined geographic location and sends the exit verification signal to the biometric device, the biometric device receives the exit verification signal from the central server and displays an exit verification in response to the received exit verification signal, only if the geographic location is outside the United States; and
wherein the biometric device is shut down and disabled upon receiving the exit verification signal or the biometric device disconnects the wireless connection upon receiving the exit verification signal.

21. A biometric system useable to control human access to an arbitrary area, the biometric system comprising:
a biometric device comprising:
a biometric capture system that reads specified biometric information from an individual and that compares the specified biometric information to previously stored biometric information to determine a match between the read and stored biometric information;
a position location system that determines geographic location data of the biometric device;
an encryption system that encrypts the geographic location data and a device-unique identification; and
a wireless system, using a wireless connection, that sends the encrypted geographic location data and the encrypted device-unique identification to a central server;
wherein the central server determines a geographic location of the biometric device from the encrypted geographic location data received from the biometric device;
wherein the biometric device receives a test satisfactory signal from the central server if the geographic location is inside the United States;
wherein the central server determines that an exit verification procedure is in progress and updates a travel record with the date and time of exit, the central server generates an exit verification signal based on the determined geographic location and sends the exit verification signal to the biometric device, the biometric device receives the exit verification signal from the central server and displays an exit verification in response to the received exit verification signal, only if the geographic location is outside the United States; and
wherein the biometric device is shut down and disabled upon receiving the exit verification signal or the biometric device disconnects the wireless connection upon receiving the exit verification signal.

22. A method for controlling human access to an arbitrary area, the method comprising:
reading specified biometric information from an individual using a biometric device;
comparing, using the biometric device, the specified biometric information to previously stored biometric information to determine a match between the read and stored biometric information;
determining geographic location data of the biometric device using the biometric device;
encrypting, using the biometric device, the geographic location data and a device-unique identification;
sending, using a wireless connection, the encrypted geographic location data and the encrypted device-unique identification from the biometric device to a central server provided at a remote location; and
the biometric device receiving a signal from the central server based on a determination of a geographic location of the biometric device made by the central server from the encrypted geographic location data;
wherein the received signal is a test satisfactory signal if the geographic location of the biometric device is inside a defined geographic area;
wherein the received signal is an exit verification signal if the geographic location of the biometric device is outside the defined geographic area, the central server:
determining that an exit verification procedure is in progress; and
updating a travel record with the date and time of exit; and
wherein the biometric device is shut down and disabled upon receiving the exit verification signal or the biometric device disconnects the wireless connection upon receiving the exit verification signal.

* * * * *